Jan. 22, 1957 J. A. GREGOIRE ET AL 2,779,018

ELECTRO-MAGNETIC DISTANCE MEASURING DEVICE

Filed July 3, 1950 2 Sheets-Sheet 1

Inventors
J. A. Gregoire
M. J. Cambornac
By Wenderoth, Lind & Ponack
attorneys

Jan. 22, 1957 J. A. GREGOIRE ET AL 2,779,018

ELECTRO-MAGNETIC DISTANCE MEASURING DEVICE

Filed July 3, 1950 2 Sheets-Sheet 2

Inventors
J. A. Gregoire
M. J. Cambornac
By Wenderoth, Lind & Ponack
attorneys 2,779,018

ELECTRO-MAGNETIC DISTANCE MEASURING DEVICE

Jacques A. Gregoire and Michel J. Cambornac, Paris, France, assignors to Office National d'Etudes et de Recherches Aeronautiques, Paris, France, a corporate body of France Application July 3, 1950, Serial No. 171,944

Claims priority, application France July 7, 1949

3 Claims. (Cl. 343—12)

Figure 1:
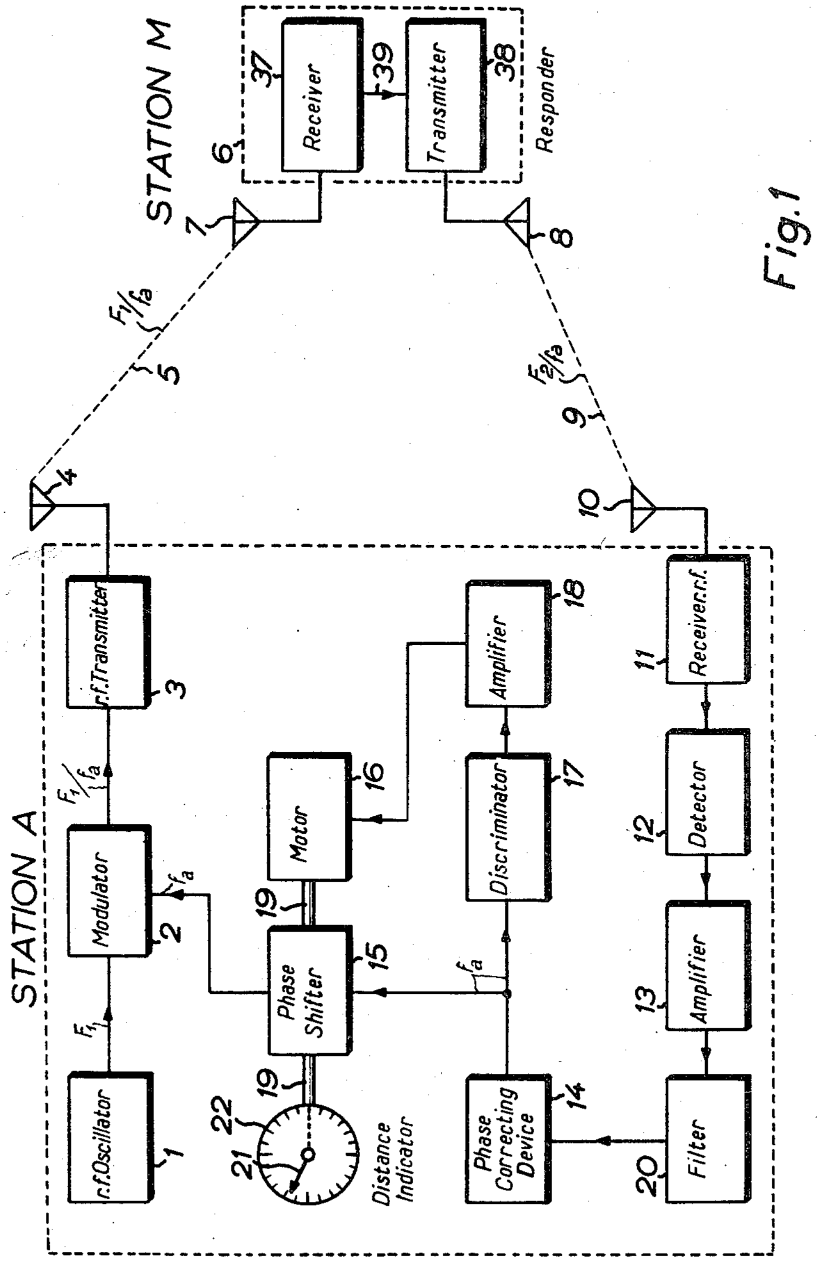

The present invention relates to a radio system for measuring the distance between two radio stations by means of phase displacements of a non-pulsatory electromagnetic wave.

Telemetric systems are known in which distance is measured by the time required to transmit a radio signal from a local station to a remote station and an answering signal to return. In these systems an audio frequency wave of precisely known frequency and phase is modulated onto a first high frequency wave carrier, then transmitted from the local station toward the remote station, there received, demodulated and modulated onto a second high frequency wave carrier and retransmitted, unaltered in frequency and with constant phase-shift backward to the local station. The measurement then consists in determining by means of a phase comparison circuit the total phase delay of the audio frequency signal for the to and fro path, taking into account the known parasitic phase delay introduced by the transfer of the modulation from the first carrier to the second carrier made at the remote station generally termed "responder." In these systems an audio frequency signal generating means is necessary.

In some other known systems a high frequency closed radio-electric path is used which is energized by audio frequency feedback for such a modulation frequency that the total phase delay of the circuit will be an integer multiple of a cycle. In other words, a signal of variable known frequency is modulated onto the outgoing carrier wave and the return signal is demodulated from the returning carrier wave and then constitutes the input signal which is modulated onto the outgoing carrier wave. The knowledge of the frequency for which the closed path becomes self oscillating gives the distance.

In these other known systems an audio frequency signal generating means is unnecessary. These other known systems are however subject to disadvantages as follows:

The operation is carried out at variable frequencies since the modulation frequency for which the closed path becomes self oscillating is variable with the distance. Since the parasitic phase delay in the remote station also varies according to the frequency, one is obliged to introduce corrections of a dubious accuracy. Moreover measurement of a variable distance is transformed from the measurement of a phase change to the measurement of a variable audio frequency. The range of distances measurable with the device is thus restricted by the bandwidth necessary for the radio frequency transmitters and receivers of the local and remote stations.

The object of the present invention instead is a measuring device using as oscillatory circuit the to-and-fro path between the local and the remote station and operating on a single constant audio frequency, in spite of variation of the distance to be measured.

According to the invention the measurement of distance is carried out by means of a closed radio-link or loop including a phase shifter the phase delay of which is controlled by the discrepancy between the instantaneous natural self-oscillation frequency of the loop and a fixed frequency defined by a discriminator, the phase shifter being adjusted to bring this discrepancy to zero. The instantaneous natural self-oscillation frequency is thus held constant, the phase shifter introducing a complementary phase delay required to render the total phase change around the loop circuit equal to an integral multiple of a cycle for the fixed frequency.

According to another feature of the invention, a phase shifter is chosen, preferably of a well-known electromechanical type in which the phase delay is equal to the angular shift of a rotor with respect to a reference position. The rotor will thus supply an angular shaft position proportional to the distance to be measured, which can then be easily introduced into any operative computor.

Figure 2:
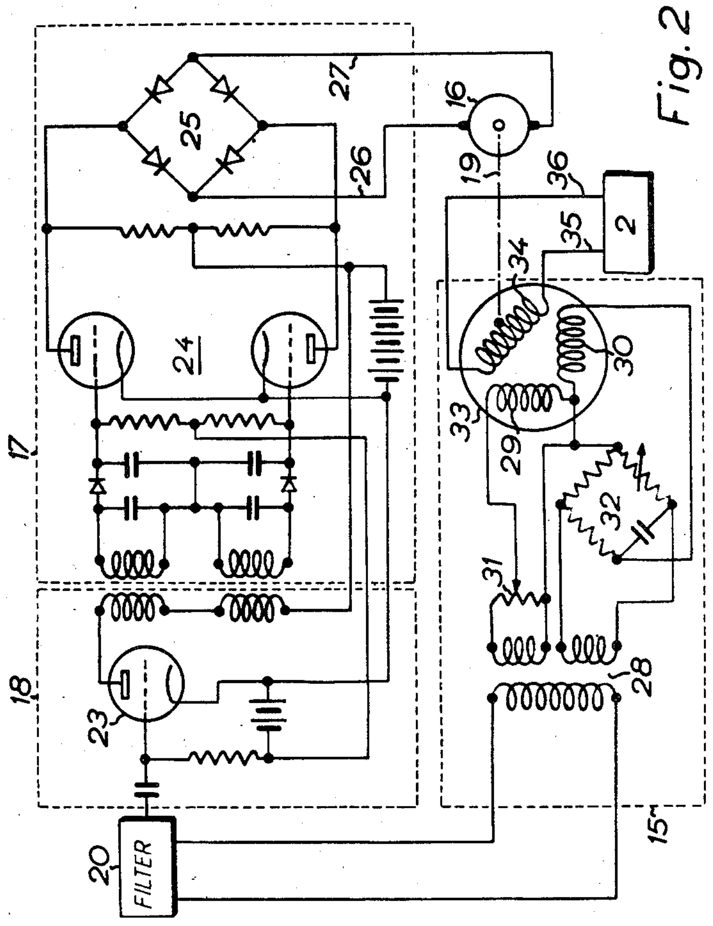

The invention will be described hereunder in detail, with reference to the accompanying drawings in which:

Fig. 1 is a schematic diagram of one embodiment of the invention showing in block form the components of the circuits at the local and remote stations between which the distance is to be measured; and Fig. 2 is a schematic diagram showing in greater detail certain of the components of a modified form of the invention at the local station.

Referring to Fig. 1, at station A an oscillator 1 generates a high frequency carrier designated by $F_1$. 2 is a modulator which is fed by the carrier $F_1$ and by an audio frequency sine wave signal designated by $f_a$ and coming from the phase shifter 15. The modulator 2 combines the modulating signal $f_a$ with the carrier in the well known manner and the resultant compound wave is fed to a radio frequency transmitter 3 and then transmitted to mobile station M through antenna 4. The transmission path is indicated by dashed line 5 connecting station A with station M and the modulated signal transmitted over this path is indicated by the symbol $F_1/f_a$.

At station M is located a responder 6 comprising a receiver 37 and a transmitter 38. Receiver 37 demodulates the signal received through antenna 7, and the demodulated signal $f_a$ is applied, through connection 39, to transmitter 38. Transmitter 38 retransmits, through antenna 8, the signal $f_a$ over a different carrier wave $F_2$. The transmission path is indicated by dashed line 9 connecting station M to station A and the modulated signal transmitted over this path is indicated by the symbol $F_2/f_a$.

Responder 6 is not disclosed in detail since such devices are known, for example from U. S. Patent 2,248,727 of July 8, 1941 issued to Howard M. Strobel.

At station A, the compound wave $F_2/f_a$ is received, through antenna 10, in a receiver 11 and demodulated by a detector 12 to obtain the original modulating signal $f_a$. This signal is then increased in strength by an amplifier 13 and next applied to a filter 20 and to a phase correcting device 14.

The output signal from phase corrector 14 is designated on Fig. 1 by the same symbol $f_a$ as the input signal to modulator 2 and has the same frequency as the latter but has undergone a substantial phase shift.

The closing between phase corrector 14 and modulator 2 of the audio frequency loop which connects the local and remote sections A and M is effected, through a phase shifter 15, the mechanical shaft 19 of which is driven by a motor 16. Motor 16 is energized by a follow-up control unit comprising a frequency discriminator 17 and amplifier 18. Discriminator 17 supplies a voltage proportional to the difference between the instantaneous self-oscillation frequency of the looped transmission path (the frequency for which the total phase delay is equal to an integral multiple of a cycle) and the frequency to which the discriminator 17 is tuned.

The carrier frequencies $F_1$ and $F_2$ should be chosen sufficiently different to avoid a direct self-oscillation at radio-frequency.

The to and fro transmission path will start oscillating over a certain natural audio-frequency $f$ for which the total phase delay due to the phase shifter 15, to the to and fro propagation path (which latter phase delay has a value $$2\pi\frac{df}{c}$$

wherein $c$ is the light velocity and $d$ the double of the distance to be measured), to the phase correcting device 14, and that parasitically introduced by the transmitters, the receivers, the amplifiers and the modulators and demodulators comprised in stations A and M is equal to a multiple of a cycle.

Assuming discriminator 17 to be centered upon audio-frequency $f_a$ the motor 16 will be fed by a signal proportional to $f-f_a$ and will rotate shaft 19 until the phase delay due to the phase-shifter 15 assumes a value for which the total phase delay previously referred to becomes equal to a multiple of a cycle at frequency $f_a$.

The phase-shift of phase correcting device 14 is given a value equal and opposite to the parasitic phase-shift value of the to and fro transmission path. Thus the phase-shift $\varphi$ due to phase-shifter 15 is given by the equation:

$$\varphi+\frac{2\pi d f_a}{c}=2k\pi$$

wherein $k$ is an integer.

If the distance $d$ varies and becomes $d'$, the self-oscillation frequency of the to and fro transmission path tends to depart from $f_a$ and to take on a value $f$ given by:

$$\varphi+\frac{2\pi d' f}{c}=2k\pi$$

assuming that phase-shifter 15 is of a type the phase-shift of which is independent of the frequency. Phase-shifter 15 is moved by the follow-up control unit until it comes to a new angular position and introduces a phase delay $\varphi'$ given by:

$$\varphi'+\frac{2\pi d' f_a}{c}=2k\pi$$

In this new angular position, the output voltage of discriminator 17 is zero and motor 16 remains at rest.

The to and fro path thus oscillates on a fixed audio-frequency $f_a$ and filter 20 may be used at the output of amplifier 13 so as to insure that the oscillations are precisely produced at the frequency $f_a$ and not at some other audio-frequencies having with $f_a$ a difference equal to $$\frac{kc}{d}$$

The distance $d$ is indicated directly and continuously by the position of the pointer 21 (coupled mechanically with the shaft 19) on the scale of the distance indicator 22.

If the phase-shifter 15 is such that it ensures the relationship $\theta=\varphi$ between the mechanical rotation $\theta$ of its shaft 19 and the electric phase delay $\varphi$ which it introduces, the neutralisation of the parasitic phase-shift due to the electric circuits in stations A and M may be effected by giving to the shaft 19 an angular position which is equal and opposite to the parasitic phase-shift for the zero phase-shift introduced by 15, i. e. when $$\frac{2\pi d f_a}{c}$$

is a multiple of a cycle.

Referring to Fig. 2, 20 is as before a band-pass filter tuned to $f_a$ receiving audio energy from amplifier 13 of Fig. 1, 23 is an amplifier and 24 a conventional frequency discriminator. The output signal of said discriminator is detected by rectifier bridge 25 and rectified voltage is applied to servo-motor 16 through leads 26 and 27.

A sine wave voltage of frequency $f_a$ is also applied to the primary winding of transformer 28. Via an attenuating circuit 31 and a 90° advance phase shifter circuit 32, the secondary windings of this transformer feed selsyn windings 29 and 30 respectively with voltages displaced with respect to each other by 90°. A rotating field is thus obtained in selsyn 33.

The rotor winding 34 of selsyn 33 is mounted upon shaft 19 of motor 16 and its output terminals are connected to input terminals of modulator 2 through leads 35 and 36.

Rest position of rotor 34 being shifted by angle $\theta_a$ in order to compensate the parasitic phase shift we have:

$$d=2\pi-\frac{(\theta+\theta_a)c}{2\pi f_a}$$

assuming $K=1$, which is read on scale 22 directly calibrated in terms of distance.

What we claim is:

1. A system for measuring the distance between a first point and a second point comprising at said first point a first radio frequency transmitter having a modulation part and adapted to transmit a first amplitude-modulated signal, a variable phase-shifter having its output coupled to the modulation part of said first transmitter, a first radio frequency receiver at said second point for receiving and demodulating said first signal, connection means for applying said demodulated first signal to a second transmitter at said second point, said second transmitter retransmitting toward said first point a second signal amplitude-modulated by the same frequency as the first signal, a second radio frequency receiver at the first point for deriving the modulation component of said second signal, connection means between the second receiver and the input of the variable phase-shifter for applying the modulation component of said second signal to said variable phase-shifter, whereby the whole closed path including the first transmitter, the transmission path between the first transmitter and the first receiver, the connection means between the first receiver and the second transmitter, the transmission path between the second transmitter and the second receiver and the phase-shifter inserted between the second receiver and the first transmitter tends to self-oscillate on a modulation frequency for which its total phase-shift is an integral multiple of a cycle for a given distance between the first and second points, and a follow-up unit adapted to control the phase-shifter and comprising a frequency discrimination means having its input connected to the input of the phase-shifter, said frequency discrimination means being tuned to a given fixed frequency and giving at its output a voltage proportional to the difference between the frequency at which the whole closed path tends to self-oscillate and the given fixed frequency to which said frequency discrimination is tuned, and a motor driving the variable phase-shifter and fed by said voltage, whereby the self-oscillation frequency of the whole path is compelled to be equal to the tuning frequency of the discrimination means.

2. A system for measuring the distance between two stations, said system comprising at one of said stations: a first modulated radio transmitter operating on a first carrier frequency, a second radio receiver tuned to a second carrier frequency, a variable phase shifter and a frequency discriminator having their signal inputs coupled to the output of said second receiver, and a servomechanism coupled between the output of said discriminator and the phase shift varying elements of said phase shifter, the signal output of said phase shifter being coupled to the modulation input of said first transmitter; said system comprising at the other of said stations: a first radio receiver tuned to said first carrier frequency, a second modulated radio transmitter tuned to said second carrier frequency, and means coupling the output of said first receiver to the modulation input of said second transmitter.

3. A system for measuring the distance between two stations comprising at each of said stations a modulated radio transmitter and a radio receiver, said transmitters being tuned to different carrier frequencies and the receiver at each station being tuned to the carrier frequency of the transmitter at the other of said stations, and means providing at each of said stations a signal path for modulation frequencies between the output of the receiver at that station and the modulation input of the transmitter at that station, the coupling at one of said stations including a variable phase shifter, said phase shifter having a signal input for modulation frequencies coupled to the output of the receiver at said one station, whereby the closed loop including both transmitters and receivers and the paths between said two stations tends to self-oscillate with a modulation on the carrier waves between said stations for which the total phase change around the loop is an integral number of cycles, a frequency discriminator having its signal input coupled to the output of the receiver at said one of said stations, and a servomechanism coupled between the output of said discriminator and the phase shift varying elements of said phase shifter, whereby upon departure of said modulation frequency of self-oscillation from the frequency to which said discriminator is tuned there is developed in said discriminator a signal to said servomechanism which adjusts the phase shift introduced by said phase shifter until the phase change around the loop is an integral number of cycles for modulation of the frequency to which said discriminator is tuned.

References Cited in the file of this patent

UNITED STATES PATENTS

| | | |
|---|---|---|
| 1,750,668 | Green | Mar. 18, 1930 |
| 2,424,263 | Woodyard | July 22, 1947 |
| 2,528,119 | Crosby | Oct. 31, 1950 |
| 2,529,510 | Manley | Nov. 14, 1950 |
| 2,537,574 | Crosby | Jan. 9, 1951 |
| 2,542,983 | Beatty | Feb. 27, 1951 |
| 2,546,973 | Chatterjea | Apr. 3, 1951 |

FOREIGN PATENTS

| | | |
|---|---|---|
| 103,682 | Sweden | Feb. 10, 1942 |

OTHER REFERENCES

Radio Engineering by Terman, 3rd edition, McGraw-Hill, pages 483–501 and 522–525.